US 7,058,950 B2

(12) United States Patent
Jeyaraman

(10) Patent No.: US 7,058,950 B2
(45) Date of Patent: Jun. 6, 2006

(54) CALLBACK EVENT LISTENER MECHANISM FOR RESOURCE ADAPTER WORK EXECUTIONS PERFORMED BY AN APPLICATION SERVER THREAD

(75) Inventor: Thulasiraman Jeyaraman, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 658 days.

(21) Appl. No.: 10/106,293

(22) Filed: Mar. 25, 2002

(65) Prior Publication Data

US 2004/0015974 A1    Jan. 22, 2004

Related U.S. Application Data

(60) Provisional application No. 60/367,138, filed on Mar. 21, 2002.

(51) Int. Cl.
*G06F 9/46*    (2006.01)
(52) U.S. Cl. ...................................... 718/104
(58) Field of Classification Search .................. 707/1; 709/101; 718/104, 107
See application file for complete search history.

(56) References Cited

U.S. PATENT DOCUMENTS

| | | | |
|---|---|---|---|
| 5,787,245 A * | 7/1998 | You et al. ..................... 714/38 |
| 5,835,770 A | 11/1998 | Shum et al. |
| 6,003,050 A | 12/1999 | Silver et al. |
| 6,038,590 A | 3/2000 | Gish |
| 6,708,163 B1 | 3/2004 | Kargupta et al. |
| 6,721,777 B1 * | 4/2004 | Sharma ..................... 718/101 |
| 6,757,899 B1 | 6/2004 | Zhdankin et al. |
| 6,816,882 B1 | 11/2004 | Conner et al. |
| 6,826,716 B1 | 11/2004 | Mason |
| 2002/0147961 A1 | 10/2002 | Charters et al. |
| 2003/0093402 A1 * | 5/2003 | Upton ........................... 707/1 |
| 2003/0093470 A1 | 5/2003 | Upton |
| 2003/0097574 A1 | 5/2003 | Upton |
| 2003/0105884 A1 | 6/2003 | Upton |
| 2003/0182452 A1 | 9/2003 | Upton |
| 2003/0182459 A1 | 9/2003 | Jeyaraman |
| 2003/0236923 A1 | 12/2003 | Jeyaraman et al. |

* cited by examiner

*Primary Examiner*—Meng-Al T. An
*Assistant Examiner*—Camquy Truong
(74) *Attorney, Agent, or Firm*—Beyer Weaver & Thomas, LLP

(57) ABSTRACT

A method, apparatus and system arranged to provide a contract between an application server and a resource adapter that allows the resource adapter to do work (monitor network endpoints, call application components, etc) by submitting work instances to an application server for execution. In the described embodiment, the application server dispatches threads to execute submitted work instances thereby allowing the requesting resource adapter to avoid creating or managing threads directly. In this way, a mechanism for the resource adapter to do its work is provided as well as allowing the application server to efficiently pool threads and have more control over its runtime environment.

12 Claims, 5 Drawing Sheets

CALLBACK EVENT LISTENER MECHANISM FOR RESOURCE ADAPTER WORK EXECUTIONS PERFORMED BY AN APPLICATION SERVER THREAD

CROSS REFERENCE TO RELATED APPLICATIONS

This application claims priority under 35 U.S.C §119(e) of U.S. Provisional Patent Application No. 60/367,138 filed Mar. 21, 2002, now expired, entitled "J2EE Connector Architecture" naming Thuhlasisann Jeyaraman as inventor, which is also incorporated herein by reference for all purpose This application is also related to the following co-pending U.S Patent applications, which are filed concurrently with this application and each of which are herein incorporated by, (i) U.S. Patent Application No. 10/106,680, entitled "Architecture for Plugging Messaging Sytems Into An Apllication Server" naming Jeyaraman as inventor; (ii) U.S.Patent Application No. 10/106,671, entitled "Mechanism to Manage the Lifecycle of a Resource Adapter" naming Icyaraman as inventor each of which are incorporated by reference in their entirety.

BACKGROUND OF THE INVENTION

1. Field of Invention

The invention relates generally to computer systems. More particularly, methods and apparatus for managing a lifecycle of a resource adapter by an associated application server.

2. Description of Relevant Art

In modern Enterprise Information Systems (EIS) is formed to include a number of EIS resources. An EIS resource provides EIS-specific functionality to its clients examples of which include a record or set of records in a database system, a business object in an ERP system, and a transaction program in a transaction processing system. Generally, an EIS is formed of a number of interconnected personal computers, workstations, mainframes, and the like along with other devices such as large mass storage subsystems, network interfaces, as well as interfaces to the public telephony systems are interconnected providing an integrated environment in which information may be shared among the various users. Typically, users may be performing a variety of operations, including order receipt, manufacturing, shipping, billing, inventory control, and other operations in which sharing of data on a real time basis provides a significant advantage over, for example, maintaining separate records and attempting to reconcile them later.

The Java 2 Platform, Enterprise Edition (J2EE) provides containers for client applications, web components (based on servlets, Java Server Pages) and Enterprise JavaBeans components. These containers provide deployment and runtime support for application components as well as an integrated view of the services provided by underlying application server for the associated application components. Containers can run on existing systems such as, for example, web servers (for the web containers) application servers, TP monitors, and database systems for EJB containers enabling EISs to leverage both the advantages of their existing systems and those of J2EE. For example, EISs can write (or rewrite) new applications using J2EE capabilities and can also encapsulate parts of existing applications in Enterprise Java Beans (EJB), Message Driven Beans (MDB), Java Server Pages (JSP) or Servlets. IN addition, EIS applications access functions and data associated with applications running on Enterprise Information Systems (EIS).

The J2EE Connector architecture defines standard contracts which allows bi-directional connectivity between enterprise applications and EISs. An architecture for integration of J2EE servers with EISs is referred to as a connector architecture. There are two parts to the connector architecture: an EIS vendor-provided resource adapter and an application server that allows this resource adapter to plug in. The contracts support bi-directional communication between the application server and the resource adapter.

In the context of this discussion, a resource adapter is a system-level software driver that is used by a Java application to connect to an EIS. Some resource adapters merely function as a passive library which execute in the context of an application thread; they do not need to create threads explicitly to do their work. But more sophisticated resource adapters may need threads for their proper functioning. Such resource adapters may use threads to listen to network endpoints, process incoming data, communicate with a network peer, do its internal work, dispatch calls to application components, etc. Even though a resource adapter could create Java threads directly and use them to do its work, an application server may prevent it from creating threads for efficiency, security and manageability reasons. In such situations, a resource adapter needs a mechanism to obtain threads from an application server to do its work.

Therefore what is required is a mechanism that allows a resource adapter to submit work instances to an application server for execution thereby allowing the resource adapter to avoid creating or managing threads directly and allowing the application server more control over its runtime environment.

SUMMARY OF THE INVENTION

Broadly speaking, the invention relates to a method, apparatus and system arranged to provide a contract between an application server and a resource adapter that allows the resource adapter to do work (monitor network endpoints, call application components, etc) by submitting work instances to an application server for execution is described. As a method, a work manager instance is obtained from a bootstrap context instance and a work instance is created by the resource adapter. The work instance is submitted to a work manager, wherein the application server includes a pool of free threads waiting for the submitted work instance to be submitted one of which is picked up by the work instance after which a work method is called. The resource adapter is notified to prepare to release the thread executing the work instance and a release is called on the work instance from a separate thread when the execution is completed.

In another embodiment of the invention is disclosed that includes means for obtaining a work manager instance from a bootstrap context instance and means for creating a work instance by the resource adapter, means for submitting the work instance to a work manager, wherein the application server includes a pool of free threads waiting for the submitted work instance to be submitted, means for picking up one of the free threads by the work instance, means for calling a work method, means for notifying the resource adapter to prepare to release the thread executing the work instance, and means for calling a release on the work instance from a separate thread when the execution is completed.

In yet another embodiment of the invention, a computer program product for for executing a work request by a resource adapter by an application server is disclosed. The computer program product includes computer code for obtaining a work manager instance from a bootstrap context instance, computer code for creating a work instance by the resource adapter, computer code for submitting the work instance to a work manager in the application server, wherein the application server includes a pool of free threads available to service the submitted work instance, computer code for picking up one of the free threads by the work instance, computer code for calling a work method, computer code for notifying the resource adapter to prepare to release the thread executing the work instance, computer code for calling a release on the work instance from a separate thread when the execution is completed, and a computer readable medium for storing the computer program product.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there is described a method, apparatus and system arranged to provide a contract between an application server and a resource adapter that allows the resource adapter to do work (monitor network endpoints, call application components, etc) by submitting work instances to an application server for execution. In the described embodiment, the application server dispatches threads to execute submitted work instances thereby allowing the requesting resource adapter to avoid creating or managing threads directly. In this way, a mechanism for the resource adapter to do its work is provided as well as allowing the application server to efficiently pool threads and have more control over its runtime environment.

By providing a thread pool (instead of each resource adapter providing its own threads), the application server is optimally designed to manage system resources by, for example, reusing them efficiently across different resource adapters deployed in its runtime environment. In addition, since an application server knows the overall state of its runtime environment, it could make better decisions on granting threads to a resource adapter leading to better manageability of its runtime environment. For example, in some cases, a resource adapter may create non-daemon threads which interfere with the orderly shutdown of an application server. In other cases, an application server may need to enforce control over the runtime behavior of its system components (resource adapters). For example, an application server might choose to intercept operations on a thread object, perform checks, and enforce correct behavior. In still other cases, an application server may disallow resource adapters from creating their own threads based on its security policy setting.

Although, the invention will initially be described in terms of a object based system as part of a J2EE based enterprise computer system, the present invention can be used in any networked computer system.

Figure 1:
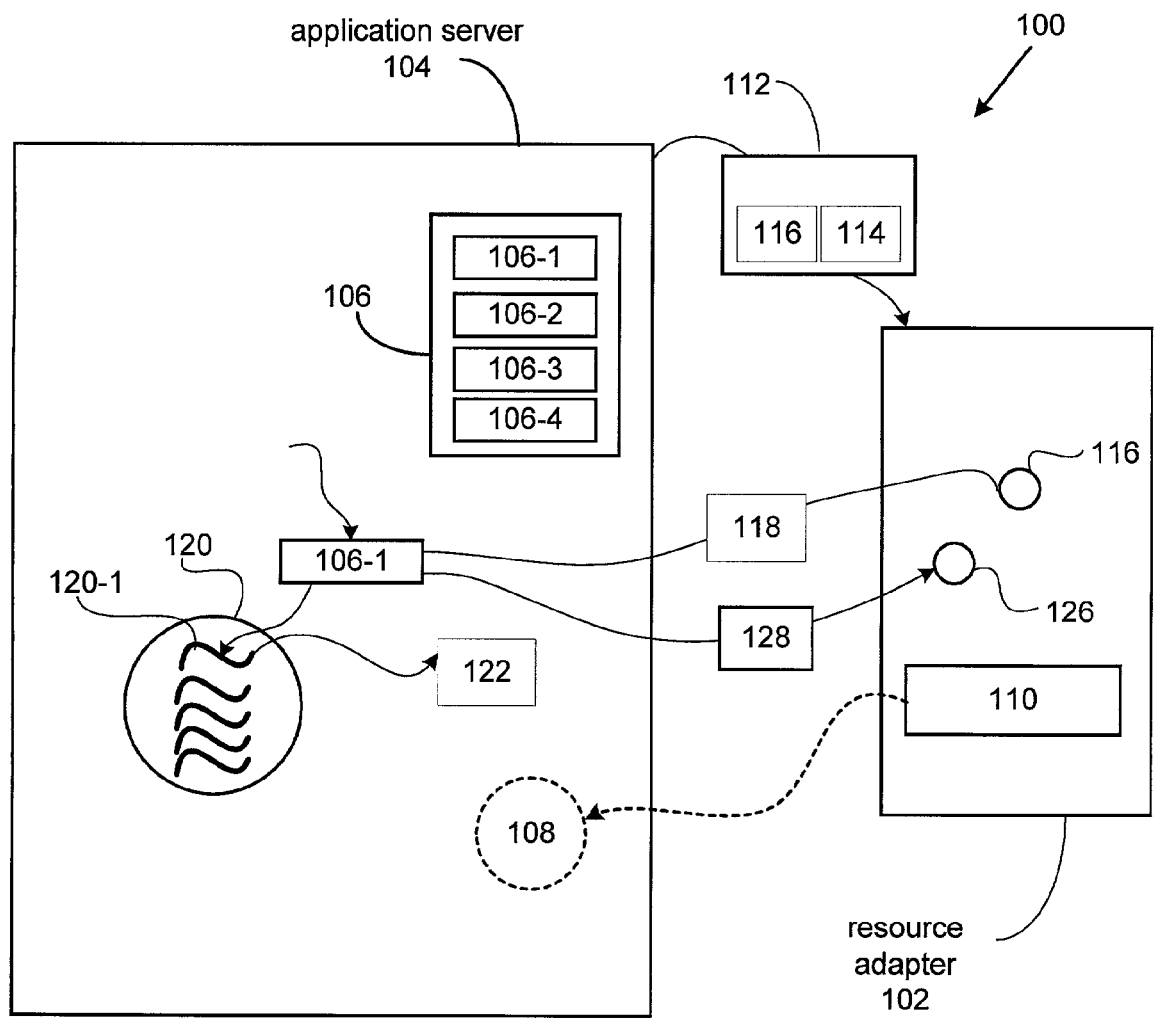
FIG. 1 shows system for executing work requests submitted by a resource adapter by an application server in accordance with an embodiment of the invention.

Accordingly, FIG. 1 shows system 100 for executing work requests submitted by a resource adapter 102 by an application server 104 in accordance with an embodiment of the invention. When the resource adapter 102 is deployed (or during start up of the application server 104), the application server 104 bootstraps an instance 108 of the resource adapter 102 in its address space. In the described embodiment, the application server 104 does this by creating the resource adapter instance 108 using the implementation class name of the resource adapter interface specified in a resource adapter deployment descriptor 110. It should be noted that each resource adapter instance represents at most one functional resource adapter or instance and, accordingly, the application server 104 must instantiate at least one resource adapter instance for every resource adapter deployed. In the described J2EE implementation, the resource adapter class is implemented as a JavaBean thereby allowing various tools to be used to configure the resource adapter instance 108 prior to its deployment.

For each resource adapter deployment, it is possible that the application server 104 may create more than one resource adapter instance. In this case, the application server 104 must isolate each resource adapter instance from all other resource adapter instances regardless of whether other resource adapter instances were created from the same deployment or not. In this way, each functional resource adapter unit is isolated from (and therefore cannot share a common class loader with) other such functional units assuring that there cannot be a shared state between multiple resource adapter instances thereby providing isolation among different resource adapter instances.

As part of the bootstrap procedure, the application server 104 provides a non-mull bootstrap context instance 112 containing references to some of the application server facilities 106 (work manager 106-1, etc) for use by the resource adapter instance 108. As part of the bootstrapping, the resource adapter 102 obtains a thread pool instance 114 from the bootstrap context instance 112 provided by the application server 102 during its deployment.

In accordance with the described embodiment, in order to submit a work request to the application server 104, the resource adapter 102 obtains a work manager instance 116 from the bootstrap context instance 112 provided by the application server 104 during its deployment. In the described embodiment, the work manager interface 116 provides a mechanism to submit work instances for execution by the application server 104. Accordingly, the resource adapter 102 creates a work instance 118 to do its work and submits them to the work manager 106-1 along with an optional execution context for execution. In the described embodiment, the application server 104 has a pool of free threads 120 waiting for the work instance 118 to be submitted. When the work instance 118 is submitted, one of the free threads 120-1 picks up the work instance 118, sets up an appropriate execution context and calls a work method 122. It should be noted that there is no restriction on the number of work instances submitted by the resource adapter 102 or when work instances may be submitted. When the work method 122 completes, the application server 104 could reuse the thread 116-1 or in some cases, the application server 104 may decide to reclaim active threads based on the current load conditions. In order to notify the resource adapter 102 that it must be prepared to release the active thread 120-1 executing the work instance 118, the application server 104 calls a release on a specific work instance from a separate thread. Although the application server 104 is free to implement its own thread pooling strategy, the application server typically uses threads of the same thread priority level to process work instances submitted by a specific resource adapter. This thread priority level requirement ensures that multiple threads processing work instances from the same resource adapter have equal claim over the CPU resources. In this way, the resource adapter builds its own internal priority based task queue without having to worry about thread priority levels.

Figure 2:
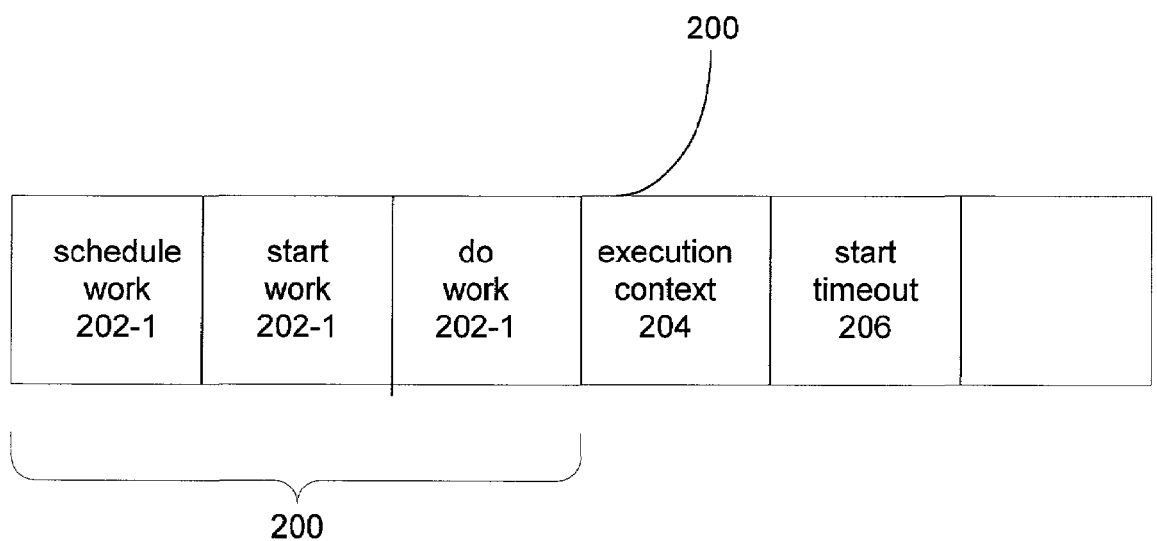
FIG. 2 shows an exemplary bootstrap context that includes a number of modes of work submission in accordance with an embodiment of the invention.

FIG. 2 shows an exemplary bootstrap context 200 that includes a number of modes of work submission 202 in accordance with an embodiment of the invention. The work submission modes 202 can include a schedule work call 202-1, a start work call 202-2, and a do work call 202-3. In the described embodiment, the schedule work call 202-1 does not block and returns immediately once a work instance has been accepted for processing. This is useful to do work asynchronously and does not provide any (execution start or execution completion) ordering guarantee for nested work submissions. However, the start work call 202-2 blocks until the work instance starts execution but not until its completion returning the time elapsed (in milliseconds) from work acceptance until start of execution. Whereas, the do work call 202-3 blocks until the work instance completes execution. In this situation, the application server might execute a work instance submitted via the do work call 206 using the same calling thread. This particular method is useful to do work synchronously whereas in the case of nested work submissions, the do work call provides a FIFO execution start ordering and LIFO execution completion ordering guarantee.

In some embodiments, an optional execution context parameter 204 provides an execution context (transaction, security, etc) with which the work instance must be executed. The execution context 204 is represented by an execution context instance containing a transaction context (id, timeout), security context, etc. In still other embodiments, an optional start timeout parameter 206 specifies a time duration (in milliseconds) within which the execution of the work instance must start.

Figure 3:
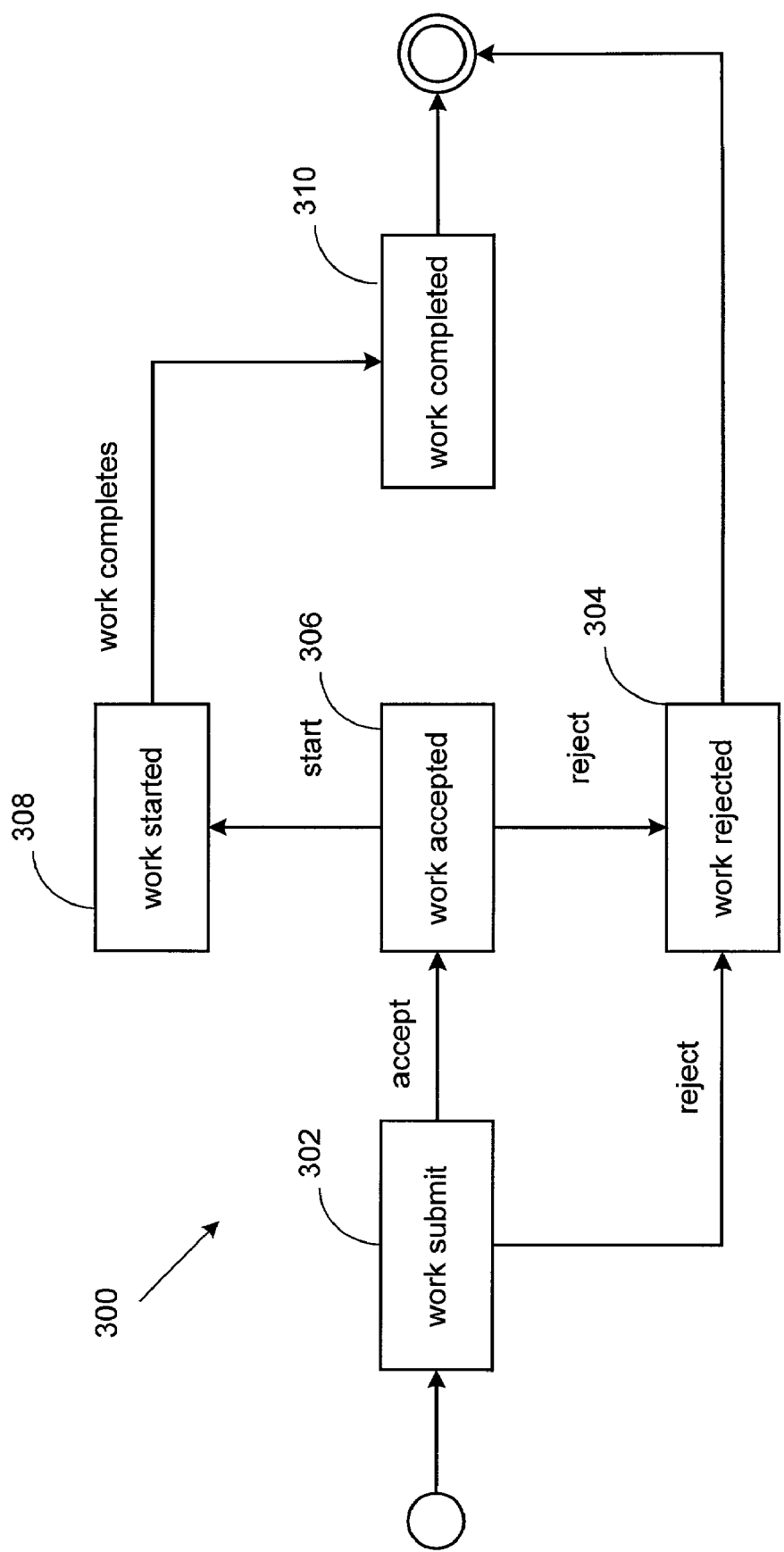
FIG. 3 shows a state diagram of a work submission status in accordance with an embodiment of the invention.

FIG. 3 shows a state diagram of a work submission status in accordance with an embodiment of the invention. Accordingly, at 302 a work request is submitted for execution. The work instance could either be accepted or rejected with a work rejected exception set to an error code at 304. It should be noted that the submitted work instance regardless of the mode of submission (i.e., do work, start work or schedule work) does not automatically inherit the submitter's execution context. Accordingly, it executes with an unspecified execution context (if none is specified) or it executes with the specified execution context. Next, if the submitted work instance has been accepted for further processing at 306, the accepted work instance could either start execution or could be rejected again with a work rejected exception set to an appropriate error code at 306. It should be noted that unless the optional start timeout duration is specified, there is no assurance when the execution of the work instance would start. However, when a start timeout is specified, the work execution must be started within the specified duration, and failing that, a work rejected exception set to an error code (for example, WorkRejected.TIMED_OUT) is thrown.

In the case where the work instance was accepted and the execution of the Work instance has started at 308, the thread has been allocated for work execution. However, this does not guarantee that the allocated thread has been scheduled to run on a CPU resource. Once execution is started, the allocated thread sets up an appropriate execution context (transaction, security, etc) and calls the appropriate work method. It should be noted that any exception thrown during execution context setup or execution of work leads to completion of processing at 310.

Referring back to FIG. 1, a work listener interface is optionally implemented by the resource adapter 102. Accordingly, when a particular work event (work accepted, work rejected, work started, work completed) is executed by the application server 104, a work listener instance 126 is supplied to the work manager during work submittal and provides an event listener callback mechanism 128 in order to be notified when the various work processing events occur.

Figure 4:
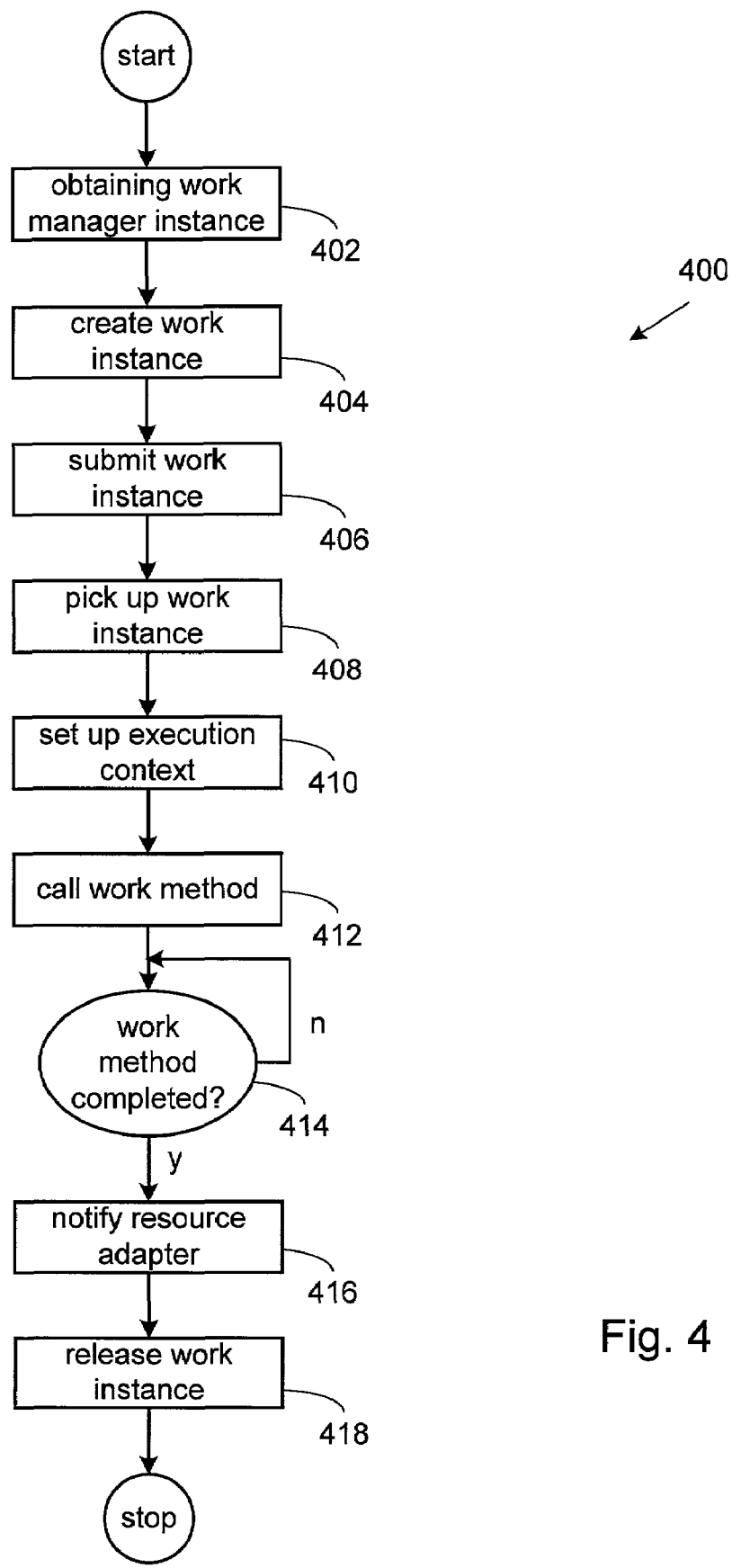
FIG. 4 shows a flowchart detailing a process for executing a work request by a resource adapter by an application server in accordance with an embodiment of the invention.

FIG. 4 shows a flowchart detailing a process 400 for executing a work request by a resource adapter by an application server in accordance with an embodiment of the invention. Accordingly, the process 400 begins at 402 by the resource adapter obtaining a work manager instance from a bootstrap context instance provided by the application server during its deployment. At 404, the resource adapter creates a work instance to do its work and submits it to the work manager at 406 along with an optional execution context for execution. In the described embodiment, the application server has a pool of free threads waiting for the work instance to be submitted. When the work instance is submitted, one of the free threads picks up the work instance at 408, sets up an appropriate execution context at 410 and calls a work method at 412. It should be noted that there is no restriction on the number of work instances submitted by the resource adapter or when work instances may be submitted. When the work method completes at 414, the application server notifies the resource adapter at 416 that it must be prepared to release the active thread executing the work instance and at 418 the application server calls a release on a specific work instance from a separate thread.

Figure 5:
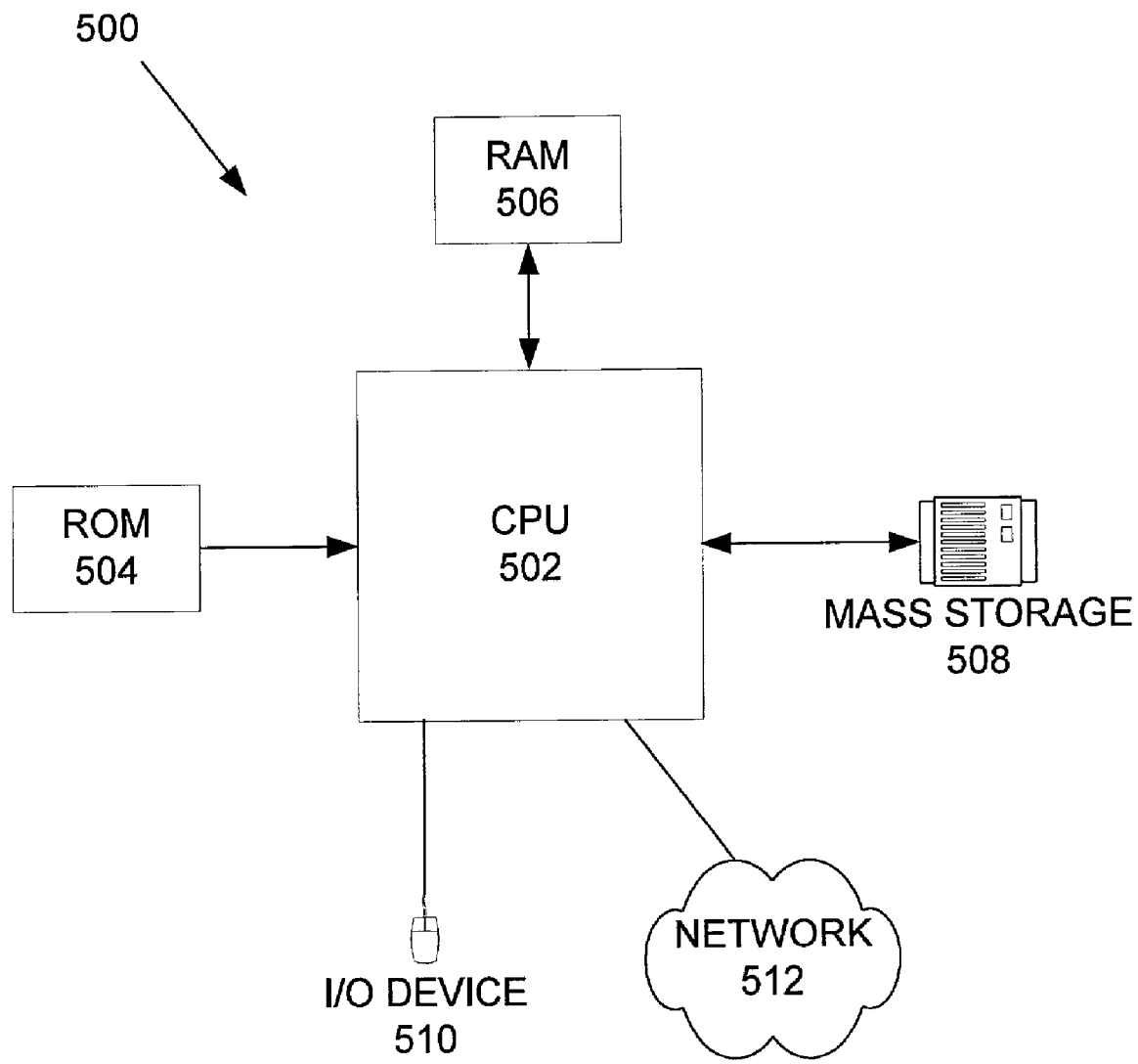
FIG. 5 illustrates a computer system that can be employed to implement the present invention.

FIG. 5 illustrates a computer system 500 that can be employed to implement the present invention. The computer system 500 or, more specifically, CPUs 502, may be arranged to support a virtual machine, as will be appreciated by those skilled in the art. As is well known in the art, ROM acts to transfer data and instructions uni-directionally to the CPUs 502, while RAM is used typically to transfer data and instructions in a bi-directional manner. CPUs 502 may generally include any number of processors. Both primary storage devices 504, 506 may include any suitable computer-readable media. A secondary storage medium 508, which is typically a mass memory device, is also coupled bi-directionally to CPUs 502 and provides additional data storage capacity. The mass memory device 508 is a computer-readable medium that may be used to store programs including computer code, data, and the like. Typically, mass memory device 508 is a storage medium such as a hard disk or a tape which generally slower than primary storage devices 504, 506. Mass memory storage device 508 may take the form of a magnetic or paper tape reader or some other well-known device. It will be appreciated that the information retained within the mass memory device 508, may, in appropriate cases, be incorporated in standard fashion as part of RAM 506 as virtual memory. A specific primary storage device 504 such as a CD-ROM may also pass data uni-directionally to the CPUs 502.

CPUs 502 are also coupled to one or more input/output devices 410 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 502 optionally may be coupled to a computer or telecommunications network, e.g., an Internet network, or an intranet network, using a network connection as shown generally at 512. With such a network connection, it is contemplated that the CPUs 502 might receive information from the network, or might output information to the network in the course of performing the above-described method steps. Such information, which is often represented as a sequence of instructions to be executed using CPUs 502, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Although only a few embodiments of the present invention have been described, it should be understood that the present invention may be embodied in many other specific forms without departing from the spirit or the scope of the present invention.

Although the methods of providing work execution resources for a resource adapter in accordance with the present invention are particularly suitable for implementation with respect to a Java™ based environment; the methods may generally be applied in any suitable object-based environment. In particular, the methods are suitable for use in platform-independent object-based environments. It should be appreciated that the methods may also be implemented in some distributed object-oriented systems.

It should also be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. A method for executing a work request by a resource adapter by an application server, comprising:
   providing a bootstrap context instance by the application server during deployment of the application server, wherein the bootstrap context instance includes an instance of a work manager,
   obtaining the instance of the work manager from the bootstrap context instance by the resource adapter;
   creating a work instance by the resource adapter;
   submitting, using mechanisms provided by the obtained instance of the work manager, the work instance to the work manager in the application server, wherein the application server includes a pool of free threads available to service the submitted work instance;
   picking up one of the free threads by the work instance;
   calling a work method in the application server;
   notifying, by the application server, the resource adapter to prepare to release the thread executing the work instance; and
   calling, by the application server, a release on the work instance from a separate thread when the execution is completed.

2. A method as recited in claim 1, further comprising:
   implementing a work listener interface by the resource adapter.

3. A method as recited in claim 2, further comprising:
   executing a particular work event by the application server, wherein the particular work event includes a work accepted work event, a work rejected work event, a work started work event, and a work completed work event.

4. A method as recited in claim 3, further comprising:
   supplying a work listener instance to the work manager during the work submittal; and
   providing an event listener callback mechanism in order to be notify the resource adapter when a specific one of the work processing events has occurred.

5. An apparatus for executing a work request by a resource adapter by an application server, comprising:
   means for providing a bootstrap context instance by the application server during deployment of the application server, wherein the bootstrap context instance includes an instance of a work manager, means for obtaining the instance of the work manager from the bootstrap context instance byte resource adapter;

means for creating a work instance by the resource adapter;

means for submitting using mechanisms provided by the obtained instance of the work manager, the work instance to the work manager in the application server, wherein the application server includes a pool of free threads available to service the submitted work instance;

means for picking up one of the free threads by the work instance;

means for calling a work method in the application server;

means for notifying, by the application server, the resource adapter to prepare to release the thread executing the work instance; and means for calling, byte application server, a release on the work instance from a separate thread when the execution is completed.

6. An apparatus as recited in claim 5, further comprising:
means for implementing a work listener interface by the resource adapter.

7. An apparatus as recited in claim 6, further comprising:
means for executing a particular work event by the application server, wherein the particular work event includes a work accepted work event, a work rejected work event, a work started work event and a work completed work event.

8. An apparatus as recited in claim 6, further comprising means for supplying a work listener instance to the work manager during the work submittal; and means for providing an event listener callback mechanism in order to be notify the resource adapter when a specific one of the work processing events has occurred.

9. A computer program product for executing a work request by a resource adapter by an application sewer, comprising computer code for providing a bootstrap context instance by the application server during deployment of the application server, wherein the bootstrap context instance includes an instance of a work manager;

computer code for obtaining the instance of the work manager from the bootstrap context instance by the resource adapter;

computer code for creating a work instance byte resource adapter;

computer code for submitting, using mechanisms provided byte obtained instance of the work manager, the work instance to the work manager in the application server, wherein the application sewer includes a pool of free threads available to service the submitted work instance;

computer code for picking up one of the free threads by the work instance;

computer code for calling a work method in the application server;

computer code for notifying, by the application sewer, the resource adapter to prepare to release the thread executing the work instance; and computer code fur calling, by the application server, a release on the work instance from a separate thread when the execution is completed; and a computer readable medium for storing the computer program product.

10. A computer program product as recited in claim 9, further comprising computer code for implementing a work listener interface by the resource adapter.

11. A computer program product as recited in claim 10, further comprising:

computer code for executing a particular work event by the application server, wherein the particular work event includes a work accepted work event a work rejected work event, a work started work event, and a work completed work event.

12. A computer program product as recited in claim 11, further comprising:

computer code for supplying a work listener instance to the work manager during the work submittal; and computer code for providing an event listener callback mechanism in order to be notify the resource adapter when a specific one of the work processing events has occurred.

* * * * *

UNITED STATES PATENT AND TRADEMARK OFFICE
CERTIFICATE OF CORRECTION

PATENT NO. : 7,058,950 B2 Page 1 of 1
APPLICATION NO. : 10/106293
DATED : June 6, 2006
INVENTOR(S) : Thulasiraman Jeyaraman It is certified that error appears in the above-identified patent and that said Letters Patent is hereby corrected as shown below:

Column 4, line 56, change "non-mull" to --non-null--.

(column 9, line 2) change "byte" to --by the--.

(column 9, line 18) change "byte" to --by the--.

(column 9, line 38) change "sewer" to --server--.

(column 10, line 1) change "byte" to --by the--.

(column 10, line 4) change "byte" to --by the--.

(column 10, line 6) change "sewer" to --server--.

(column 10, line 15)) change "sewer" to --server--.

(column 10, line 18) change "fur calling" to --for calling--.

Signed and Sealed this

Fifth Day of September, 2006

JON W. DUDAS
*Director of the United States Patent and Trademark Office*